US009965984B2

(12) United States Patent
Moore et al.

(10) Patent No.: US 9,965,984 B2
(45) Date of Patent: May 8, 2018

(54) CLIMATE CONTROL PANEL WITH NON-PLANAR DISPLAY

(71) Applicant: Braeburn Systems LLC, Montgomery, IL (US)

(72) Inventors: Glenn A. Moore, Geneva, IL (US); Daniel S. Poplawski, Oswego, IL (US); Ernest E. Soderlund, Hampshire, IL (US)

(73) Assignee: Braeburn Systems, LLC, Montgomery, IL (US)

( * ) Notice: Subject to any disclaimer, the term of this patent is extended or adjusted under 35 U.S.C. 154(b) by 0 days. days.

(21) Appl. No.: 15/296,814

(22) Filed: Oct. 18, 2016

(65) Prior Publication Data

US 2017/0103689 A1    Apr. 13, 2017

Related U.S. Application Data

(63) Continuation of application No. 15/204,917, filed on Jul. 7, 2016, which is a continuation of application No. 14/097,430, filed on Dec. 5, 2013.

(Continued)

(51) Int. Cl.
*G09G 3/04*    (2006.01)
*F24F 11/00*    (2018.01)
(Continued)

(52) U.S. Cl.
CPC ............ *G09G 3/04* (2013.01); *F24F 11/0086* (2013.01); *F24F 11/30* (2018.01); *G06F 3/041* (2013.01);
(Continued)

(58) Field of Classification Search
CPC ........ G06F 3/41; G06F 3/0412; G06F 3/0416; G06F 3/044–3/047; G06F 3/0481;
(Continued)

(56) References Cited

U.S. PATENT DOCUMENTS 2,054,039 A    9/1936  Persons
2,060,636 A    11/1936  Persons
(Continued)

FOREIGN PATENT DOCUMENTS

JP    58065977    4/1983
JP    2004218436    8/2004
JP    2006009596    1/2006

OTHER PUBLICATIONS

Dolcourt, J. et al. "What You Should Know About Flexible Displays", CNET, published Nov. 14, 2013 https://www.cnet.com/news/what-you-should-know-about-flexible-displays-faq/.
(Continued)

*Primary Examiner* — Nathan Danielsen
(74) *Attorney, Agent, or Firm* — The Law Offices of Konrad Sherinian, LLC (57) ABSTRACT

A control panel includes a current altering device for control of peripheral devices and a display having a first segment, second segment and third segment and the first and second segments are not located in the same plane. The display includes at least one touch sensitive segment to operate a peripheral control function. The display includes alphanumeric display areas adjacent to first and second segments. In an embodiment the display may have an arc shape and the first segment is located at an apex of the arc of the display in a first plane and a second segment is located in a second plane.

31 Claims, 8 Drawing Sheets

Related U.S. Application Data (60) Provisional application No. 61/733,558, filed on Dec. 5, 2012.

(51) Int. Cl.
  *G06F 3/041*      (2006.01)
  *G06F 3/0481*     (2013.01)
  *G06F 3/0484*     (2013.01)
  *G06F 3/0488*     (2013.01)

(52) U.S. Cl.
  CPC ...... *G06F 3/04817* (2013.01); *G06F 3/04847* (2013.01); *G06F 3/04886* (2013.01); *G09G 2380/02* (2013.01)

(58) Field of Classification Search
  CPC .......... G06F 3/04817–3/04847; G06F 3/0487; G06F 3/0488; G06F 3/04886; G06F 2203/04102; G06F 2203/04103; G09G 3/04; G09G 3/30–3/3291; G09G 3/36–3/3696; G09G 2380/02; F24F 11/0086; F24F 11/009; F24F 2011/0087; F24F 2011/0089; F24F 2011/0091–2011/0098
  See application file for complete search history.

(56) References Cited

U.S. PATENT DOCUMENTS

| | | |
|---|---|---|
| 2,253,418 A | 8/1941 | Crandall et al. |
| 2,703,228 A | 3/1955 | Fleisher |
| 3,309,021 A | 3/1967 | Powers |
| 3,385,574 A | 5/1968 | Lohman |
| 3,481,588 A | 12/1969 | Lobb |
| 3,705,479 A | 12/1972 | Mcpherson |
| 3,724,824 A | 4/1973 | Mitich |
| 3,733,062 A | 5/1973 | Bracich |
| 3,774,588 A | 11/1973 | Yeagle |
| 3,799,517 A | 3/1974 | Tamm |
| 3,823,922 A | 7/1974 | McElreath |
| 4,036,597 A | 7/1977 | Filss |
| 4,056,582 A | 11/1977 | Chow |
| 4,075,864 A | 2/1978 | Schrader |
| 4,185,687 A | 1/1980 | Stockman |
| 4,316,256 A | 2/1982 | Hendricks et al. |
| 4,382,544 A | 5/1983 | Stewart |
| 4,399,031 A | 8/1983 | Imano et al. |
| 4,606,401 A | 8/1986 | Levine |
| 4,730,941 A | 3/1988 | Levine et al. |
| 4,733,719 A | 3/1988 | Levine |
| 4,838,482 A | 6/1989 | Vogelzang |
| 4,948,040 A | 8/1990 | Kobayashi et al. |
| 4,967,382 A | 10/1990 | Hall |
| 5,023,432 A | 6/1991 | Boykin |
| 5,038,851 A | 8/1991 | Mehta |
| 5,171,486 A | 12/1992 | Penno |
| 5,230,482 A | 7/1993 | Ratz et al. |
| 5,259,445 A | 11/1993 | Pratt et al. |
| 5,428,964 A | 7/1995 | Lobdell |
| 5,482,209 A | 1/1996 | Cochran et al. |
| 5,491,615 A | 2/1996 | Nichols |
| 5,547,017 A | 8/1996 | Rudd |
| 5,566,879 A | 10/1996 | Longtin |
| 5,673,850 A | 10/1997 | Uptegraph |
| 5,697,552 A | 12/1997 | McHugh et al. |
| 5,765,636 A | 6/1998 | Meyer et al. |
| 5,782,296 A | 7/1998 | Mehta |
| 5,795,505 A | 8/1998 | Burns |
| 5,873,519 A | 2/1999 | Beilfuss |
| 5,924,486 A | 7/1999 | Ehlers et al. |
| 5,937,942 A | 8/1999 | Bias et al. |
| 5,983,146 A | 11/1999 | Sarbach |
| 6,116,512 A | 9/2000 | Dushane |
| 6,196,467 B1 | 3/2001 | Dushane |
| 6,205,533 B1 | 3/2001 | Margolous et al. |
| 6,213,404 B1 | 4/2001 | Dushane |
| 6,241,156 B1 | 6/2001 | Kline et al. |
| 6,304,803 B1 | 10/2001 | Dao |
| 6,315,211 B1 | 11/2001 | Sartain |
| 6,318,639 B1 | 11/2001 | Toth |
| 6,415,023 B2 | 1/2002 | Iggulden |
| 6,435,418 B1 | 8/2002 | Toth et al. |
| 6,478,233 B1 | 11/2002 | Shah |
| 6,499,038 B2 | 12/2002 | Kitayama |
| 6,502,758 B2 | 1/2003 | Cottrell |
| 6,549,870 B2 | 4/2003 | Proffitt et al. |
| 6,595,430 B1 | 7/2003 | Shah |
| 6,617,954 B2 | 9/2003 | Firestine |
| 6,621,507 B1 | 9/2003 | Shah |
| 6,628,997 B1 | 9/2003 | Fox et al. |
| 6,714,222 B1 | 3/2004 | Bjorn et al. |
| 6,783,079 B2 | 8/2004 | Carey et al. |
| 6,814,299 B1 | 11/2004 | Carey |
| 6,824,069 B2 | 11/2004 | Rosen |
| 6,851,621 B1 | 2/2005 | Wacker et al. |
| 6,892,547 B2 | 5/2005 | Strand |
| 6,988,671 B2 | 1/2006 | DeLuca |
| 7,003,378 B2 | 2/2006 | Poth |
| 7,028,912 B1 | 4/2006 | Rosen |
| 7,047,092 B2 | 5/2006 | Wimsatt |
| 7,050,026 B1 | 5/2006 | Rosen |
| 7,055,759 B2 | 6/2006 | Wacker et al. |
| D524,663 S | 7/2006 | Moore |
| D525,154 S | 7/2006 | Moore |
| D527,288 S | 8/2006 | Moore |
| D527,658 S | 9/2006 | Moore |
| D530,633 S | 10/2006 | Moore |
| 7,114,554 B2 | 10/2006 | Bergman et al. |
| D531,528 S | 11/2006 | Moore |
| 7,142,948 B2 | 11/2006 | Metz |
| D533,793 S | 12/2006 | Moore |
| D534,088 S | 12/2006 | Moore |
| 7,146,253 B2 | 12/2006 | Hoog et al. |
| D534,443 S | 1/2007 | Moore |
| 7,156,317 B1 | 1/2007 | Moore |
| 7,156,318 B1 | 1/2007 | Rosen |
| D536,271 S | 2/2007 | Moore |
| 7,181,317 B2 | 2/2007 | Amundson et al. |
| 7,222,800 B2 | 5/2007 | Wruck |
| 7,225,054 B2 | 5/2007 | Amundson et al. |
| 7,274,972 B2 | 9/2007 | Amundson et al. |
| 7,287,709 B2 | 10/2007 | Proffitt et al. |
| 7,302,642 B2 | 11/2007 | Smith et al. |
| 7,306,165 B2 | 12/2007 | Shah |
| 7,320,110 B2 | 1/2008 | Shah |
| 7,360,717 B2 | 4/2008 | Shah |
| 7,438,469 B1 | 10/2008 | Moore |
| 7,454,269 B1 | 11/2008 | Dushane et al. |
| 7,489,303 B1 | 2/2009 | Pryor |
| 7,513,438 B2 | 4/2009 | Mueller |
| 7,556,207 B2 | 7/2009 | Mueller et al. |
| 7,565,813 B2 | 7/2009 | Pouchak |
| 7,584,897 B2 | 9/2009 | Schultz et al. |
| 7,593,212 B1 | 9/2009 | Toth |
| 7,604,046 B2 | 10/2009 | Bergman et al. |
| 7,614,567 B2 | 11/2009 | Chapman, Jr. et al. |
| 7,636,604 B2 | 12/2009 | Bergman et al. |
| 7,693,582 B2 | 4/2010 | Bergman et al. |
| 7,693,583 B2 | 4/2010 | Wolff et al. |
| 7,703,694 B2 | 4/2010 | Mueller et al. |
| 7,706,923 B2 | 4/2010 | Amundson et al. |
| 7,748,225 B2 | 7/2010 | Butler et al. |
| 7,702,421 B2 | 8/2010 | Sullivan et al. |
| 7,775,454 B2 | 8/2010 | Mueller et al. |
| 7,784,291 B2 | 8/2010 | Butler et al. |
| 7,784,705 B2 | 8/2010 | Kasper et al. |
| 7,801,646 B2 | 9/2010 | Amundson et al. |
| 7,802,618 B2 | 9/2010 | Simon et al. |
| 7,845,576 B2 | 12/2010 | Siddaramanna |
| 7,861,941 B2 | 1/2011 | Schultz et al. |
| 7,867,646 B2 | 1/2011 | Rhodes |
| 7,941,819 B2 | 5/2011 | Stark |
| 7,954,726 B2 | 6/2011 | Siddaramanna et al. |

(56) References Cited

U.S. PATENT DOCUMENTS

| | | |
|---|---|---|
| 7,963,454 B2 | 6/2011 | Sullivan |
| D643,318 S | 8/2011 | Morrow |
| 7,992,794 B2 | 8/2011 | Leen et al. |
| 8,066,263 B1 | 11/2011 | Soderlund |
| 8,083,154 B2 | 12/2011 | Schultz et al. |
| 8,167,216 B2 | 5/2012 | Schultz et al. |
| 8,175,782 B2 | 5/2012 | Gepperth et al. |
| D662,837 S | 7/2012 | Morrow |
| D662,838 S | 7/2012 | Morrow |
| D662,839 S | 7/2012 | Morrow |
| D662,840 S | 7/2012 | Morrow |
| D663,224 S | 7/2012 | Morrow |
| 8,219,251 B2 | 7/2012 | Amundson et al. |
| 8,239,067 B2 | 8/2012 | Amundson et al. |
| 8,239,922 B2 | 8/2012 | Sullivan |
| 8,244,383 B2 | 8/2012 | Bergman et al. |
| 8,280,536 B1 | 10/2012 | Fadell et al. |
| 8,346,396 B2 | 1/2013 | Amundson et al. |
| 8,387,892 B2 | 3/2013 | Koster et al. |
| 8,517,088 B2 | 8/2013 | Moore et al. |
| 8,538,588 B2 | 9/2013 | Kasper |
| 8,549,658 B2 | 10/2013 | Kolavennu et al. |
| 8,620,460 B2 | 12/2013 | Eergman et al. |
| 8,689,353 B2 | 4/2014 | Bünter |
| 8,690,074 B2 | 4/2014 | Moore et al. |
| 8,701,210 B2 | 4/2014 | Cheng et al. |
| 8,733,667 B2 | 5/2014 | Moore et al. |
| 8,950,687 B2 | 2/2015 | Bergman |
| 8,978,994 B2 | 3/2015 | Moore et al. |
| 9,014,860 B2 | 4/2015 | Moore et al. |
| 9,201,431 B2 | 12/2015 | Lyle |
| 9,304,676 B2 | 4/2016 | Poplawski |
| 2001/0003451 A1 | 6/2001 | Armstrong |
| 2002/0065809 A1 | 5/2002 | Kitayama |
| 2002/0096572 A1 | 7/2002 | Chene et al. |
| 2004/0133314 A1 | 7/2004 | Ehlers et al. |
| 2004/0193324 A1 | 9/2004 | Hoog et al. |
| 2004/0245352 A1 | 12/2004 | Smith |
| 2004/0256472 A1 | 12/2004 | DeLuca |
| 2004/0260427 A1 | 12/2004 | Wimsatt |
| 2005/0033707 A1 | 2/2005 | Ehlers et al. |
| 2005/0040248 A1 | 2/2005 | Wacker et al. |
| 2005/0040249 A1 | 2/2005 | Wacker et al. |
| 2005/0082836 A1 | 4/2005 | Lagerwey |
| 2005/0108620 A1 | 5/2005 | Allyn et al. |
| 2005/0194457 A1 | 9/2005 | Dolan |
| 2005/0198591 A1 | 9/2005 | Jarrett et al. |
| 2006/0030954 A1 | 2/2006 | Bergman et al. |
| 2006/0220386 A1 | 10/2006 | Wobben |
| 2006/0290140 A1 | 12/2006 | Yoshida |
| 2007/0045429 A1 | 3/2007 | Chapman, Jr. et al. |
| 2007/0045441 A1 | 3/2007 | Ashworth et al. |
| 2007/0114291 A1 | 5/2007 | Pouchak |
| 2007/0221741 A1 | 9/2007 | Wagner et al. |
| 2007/0228182 A1 | 10/2007 | Wagner et al. |
| 2007/0228183 A1 | 10/2007 | Kennedy et al. |
| 2007/0257120 A1 | 11/2007 | Chapman, Jr. et al. |
| 2007/0278320 A1 | 12/2007 | Lunacek et al. |
| 2008/0271475 A1 | 11/2008 | Wuesthoff et al. |
| 2009/0001182 A1 | 1/2009 | Siddaramanna et al. |
| 2009/0024965 A1 | 1/2009 | Zhdankin et al. |
| 2009/0057424 A1 | 3/2009 | Sullivan et al. |
| 2009/0057427 A1 | 3/2009 | Geadelmann et al. |
| 2009/0062964 A1 | 3/2009 | Sullivan et al. |
| 2009/0129931 A1 | 5/2009 | Stiesdal |
| 2009/0140056 A1 | 6/2009 | Leen |
| 2009/0140064 A1 | 6/2009 | Schultz et al. |
| 2010/0031193 A1 | 2/2010 | Stark et al. |
| 2010/0070089 A1* | 3/2010 | Harrod ............... F24F 11/0086 700/277 |
| 2010/0117975 A1* | 5/2010 | Cho .................. G06F 1/1626 345/173 |
| 2010/0127502 A1 | 5/2010 | Uchino et al. |
| 2010/0145528 A1 | 6/2010 | Bergman et al. |
| 2010/0318200 A1 | 12/2010 | Foslien et al. |
| 2011/0004825 A1 | 1/2011 | Wallaert |
| 2011/0031806 A1 | 2/2011 | Altonen et al. |
| 2011/0054710 A1 | 3/2011 | Imes et al. |
| 2011/0112998 A1 | 5/2011 | Abe et al. |
| 2011/0261002 A1* | 10/2011 | Verthein ............. G06F 1/181 345/174 |
| 2011/0273394 A1 | 11/2011 | Young et al. |
| 2012/0067561 A1 | 3/2012 | Bergman et al. |
| 2012/0074710 A1 | 3/2012 | Yoshida |
| 2012/0131504 A1 | 5/2012 | Fadell et al. |
| 2012/0168524 A1 | 7/2012 | Moore et al. |
| 2012/0169675 A1 | 7/2012 | Moore et al. |
| 2012/0203379 A1 | 8/2012 | Sloo et al. |
| 2012/0221149 A1 | 8/2012 | Kasper |
| 2012/0229521 A1 | 9/2012 | Hales, IV et al. |
| 2012/0232703 A1 | 9/2012 | Moore et al. |
| 2012/0239221 A1 | 9/2012 | Mighdoll et al. |
| 2012/0329528 A1 | 12/2012 | Song |
| 2013/0032414 A1 | 2/2013 | Yilmaz et al. |
| 2013/0056989 A1 | 3/2013 | Sabhapathy |
| 2013/0215088 A1 | 8/2013 | Son et al. |
| 2013/0263034 A1 | 10/2013 | Bruck et al. |
| 2013/0338838 A1 | 12/2013 | Moore et al. |
| 2013/0345883 A1 | 12/2013 | Sloo et al. |
| 2014/0152631 A1 | 6/2014 | Moore et al. |
| 2014/0163746 A1 | 6/2014 | Drew et al. |
| 2014/0316581 A1 | 10/2014 | Fadell et al. |
| 2014/0319233 A1 | 10/2014 | Novotny et al. |
| 2015/0081568 A1 | 3/2015 | Land, III |
| 2015/0167995 A1 | 6/2015 | Fadell et al. |
| 2015/0233595 A1 | 8/2015 | Fadell et al. |
| 2015/0280935 A1 | 10/2015 | Poplawski et al. |
| 2016/0062618 A1 | 3/2016 | Fagan et al. |
| 2016/0124828 A1 | 5/2016 | Moore et al. |
| 2016/0131385 A1 | 5/2016 | Poplawski et al. |
| 2016/0154576 A1 | 6/2016 | Moore et al. |
| 2017/0103689 A1 | 4/2017 | Moore et al. |
| 2017/0131825 A1 | 5/2017 | Moore et al. |
| 2017/0300025 A1 | 10/2017 | Moore et al. |
| 2017/0364104 A1 | 12/2017 | Poplawski et al. |

OTHER PUBLICATIONS

Office Action dated Apr. 10, 2015, issued in connection with U.S. Appl. No. 14/097,430.
Office Action dated Dec. 9, 2015, issued in connection with U.S. Appl. No. 14/097,430.
Office Action dated Dec. 15, 2015, issued in connection with Mexican Patent Application No. MX/a/2013/014325.
Office Action dated Apr. 29, 2016, issued in connection with U.S. Appl. No. 14/097,430.
ComfortLink II XL950 Control, User Guide, Trane U.S. Inc., 2011.
Cardio Iie Installer's Guide, System Version 2.5xx, 5th edition, 2008, Secant Home Automation Inc.
What you should know about flexible displays (FAQ); http://news.cnet.com/8301-1035_3-57607171-94/what-you-should-know-about-flexible-d . . . ; Nov. 25, 2013.
Brae8urn Systems LLC, "Temperature Limiting Adjustments for heating and Cooling (1000 Series)", Mportant Installation Instructions.

* cited by examiner

CLIMATE CONTROL PANEL WITH NON-PLANAR DISPLAY

CROSS-REFERENCE TO RELATED APPLICATION

This application is a continuation of U.S. patent application Ser. No. 15/204,917 filed Jul. 7, 2016. The '917 application is a continuation of U.S. patent application Ser. No. 14/097,430 filed Dec. 5, 2013, which claims priority benefits from U.S. provisional patent application Ser. No. 61/733,558, filed Dec. 5, 2012. The '917 non-provisional application, the '430 non-provisional application, and the '558 provisional application are each hereby incorporated by reference herein in their entirety.

FIELD OF INVENTION

The present invention pertains to a control such as a thermostat, other household control, automotive control or manufacturing equipment control and the use of a non-planar display screen for such controls.

BACKGROUND OF THE INVENTION

It is common for controls to have LCD or LED display monitors comprised of planar rigid layers of glass and display layers including plasma display technology. Such display screens include touch sensitive displays where a user may place his or her finger on the glass surface to activate the controls and manipulate the functioning of the devices to which the control is connected electronically. The present invention improves upon such controls by incorporating a flex display, such as an electronic paper display technology; for example, a roll-up screen manufactured by LG Displays Corp.

SUMMARY OF THE INVENTION

The present invention provides a control comprising a housing including circuitry and electronic components for control of a peripheral device, the circuitry controlling at least one current altering device for the control of the peripheral device, a display mounted on the housing connected to the circuitry via a current carrying bridge member and the display having a first segment, second segment and third segment wherein the first and second segments are not located in the same plane. In an embodiment the display may have an arc shape and is attached to the housing adjacent to each side of the housing. In an embodiment the first segment and the third segment are located in the same plane. In an embodiment the first segment and third segment may be located in different planes.

In an embodiment the invention includes a housing having an opening for receiving the display and the opening formed in a first plane and at least one of the first, second and third segments extend externally beyond the first plane of the housing. In an embodiment at least one of the first, second and third segments extend to an exterior edge of the housing. In an embodiment at least one of the first, second and third segments extend internally into the housing. In an embodiment the current altering device is located externally to the housing. In an embodiment the current altering device may include a relay that interrupts the current to the peripheral device. In an embodiment the current altering device is a digital signal controller. In an embodiment the current altering device is a radio transmitter.

In an embodiment the first segment of the display includes at least one touch sensitive segment to operate at least one peripheral function of heat, cool, fan, temperature, time, ventilation, and humidity. In an embodiment the first segment of the display includes at least one touch sensitive segment to operate at least one peripheral control function of the non-English equivalent translation of heat, cool, fan, temperature, time, ventilation, and humidity. In an embodiment the first segment of the display includes at least one touch sensitive segment connected to the current altering device to operate at least one peripheral control function of an icon equivalent of heat, cool, fan, temperature, time, ventilation, and humidity.

In an embodiment the first segment is a touch sensitive area and the second segment includes an alphanumeric display area located adjacent to the first segment. In an embodiment the peripheral device includes at least one of a heat pump, air conditioner, furnace, boiler, humidifier and ventilation damper. In an embodiment the control is a thermostat.

In an embodiment the display has a non-planar shape and forms in part one of an arc, convex arc, concave arc, cube, octahedron, pentagonal prism, pyramid, tetrahedron, triangular prism, truncated pyramid, stairs, uneven stairs, cone, mushroom shape. In an embodiment the display has an arc shape and the first segment is located at an apex of the arc of the display in a first plane and the first segment is located adjacent to the second segment in a second plane and near a side edge of the housing. A first segment is located in the first plane and a second touch segment is located in the second plane. In an embodiment the housing includes an arc shaped frame member to support the display.

The invention further comprises a thermostat control comprising a housing for containing circuitry and electronic components for control of a peripheral device, the circuitry controlling at least one current altering device for control of the peripheral device, a display mounted on the housing, the display having a bridge for connecting the circuitry, the display including a first segment and a second segment and the display disposed in a non-planar shape and configured so the user interaction with the control in order to activate at least the first and second segments is configured wherein at least one X-axis movement by a user's hand is required during operation of the controls. In an embodiment the housing includes a face that defines an X-axis and a Y-axis, and the Z-axis that is defined by a line extending perpendicularly through the face of the housing so that the perpendicular line extends upward out of the face of the housing and downward through the back of the housing.

BRIEF DESCRIPTION OF THE DRAWINGS

Additional aspects and advantages of the present invention will be apparent in the following detailed description read in conjunction with the following drawing figures.

FIGS. 4a and b are a side view and a perspective view and an alternate embodiment of the display invention.

DETAILED DESCRIPTION OF ILLUSTRATIVE EMBODIMENT(S)

Figure 1A:
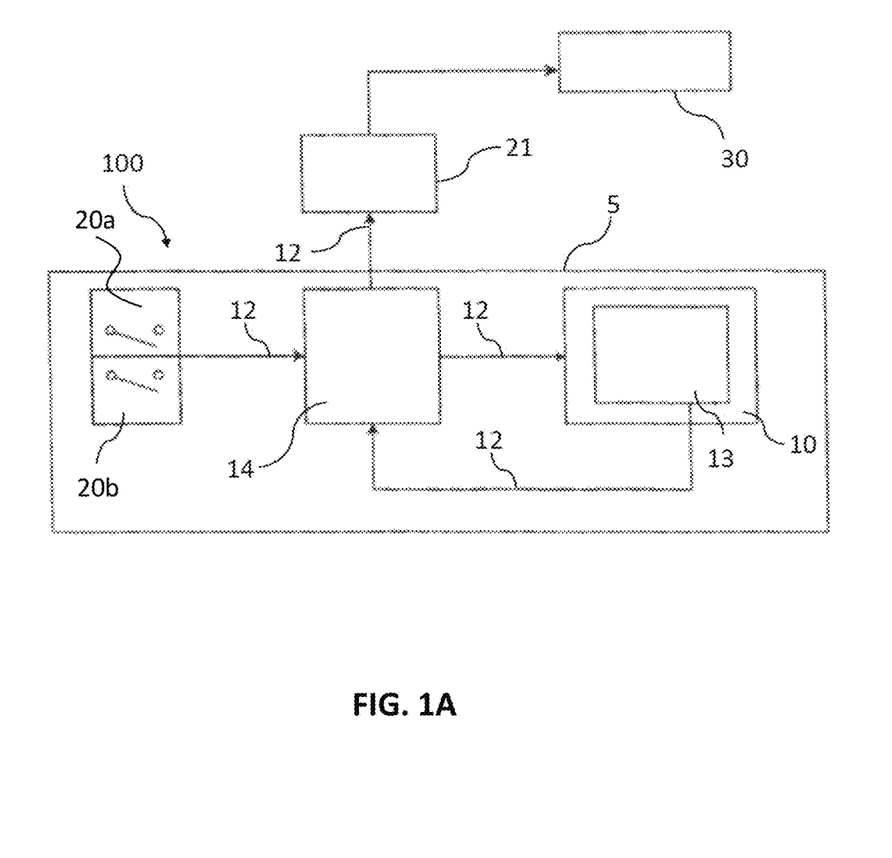
FIG. 1a is a flow diagram depicting the present invention.

FIG. 1a depicts a diagram of the present invention wherein the control 100 is depicted including the display 10 including the touchpad areas 13 which are connected through signal lines 12 to microprocessor 14 which are in turn controlled by switch 20a and switch 20b and the microprocessor is linked to the HVAC system control relay 21 via signal lines 12. The control relays 21 are linked to peripheral devices 30 such as a furnace, boiler, air conditioner, humidifier, fan or ventilation damper. The switches 1 and 2 operate the HVAC system control relays 21 and are controlled by microprocessor 14 which is linked to the display in order to provide feedback and alter the alphanumeric icons on the display 10.

Figure 1B:
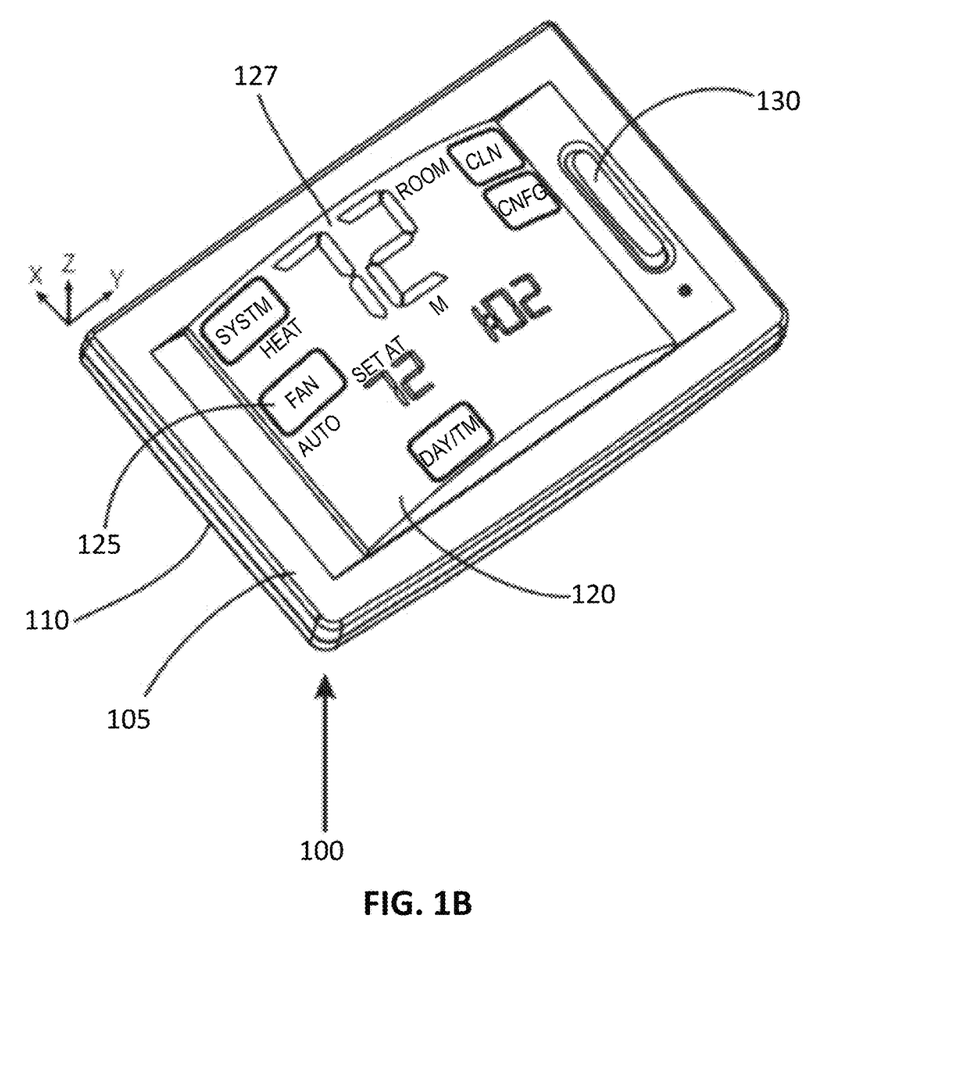
FIG. 1b is a perspective view the control of the present invention.

Turning to FIG. 1b, an embodiment of the present invention is disclosed where a thermostat 100 includes a clam shell type design with an upper housing 105 and lower housing 110 or base. Display 120 is shown having a slight curvature protruding from the upper panel 105. The display 120 (similar to other non-flexible displays) includes means for displaying alphanumeric characters and touch sensitive areas to provide means for an operator to use fingertips or pointing device to control functions of the electronics. In an embodiment, the display 120 may include a liquid crystal display (LCD), a thin film transistor (TFT)-LCD, an organic Light-emitting diode (OLED), a flexible display, a three-dimensional (3D) display or a transparent display. A display and electronics therefor may be provided, such as disclosed by LG Electronics in U.S. patent application publication No. 2012/0329528, that is incorporated herein by reference. The display, in this embodiment, includes icons for operation of the thermostats functions such as fan, such as touchpad 125. Numeric Icon 127 depicts a numeric icon as a control parameter for example, the temperature. In an embodiment, the display 120 includes touch sensitive capability and the operation of the thermostat 100 is performed by touch pads 125 for example, to operate the fan mode. The other touch pads on the display screen are also operative to control the thermostat 100. As well, mechanical button 130 provides for operation of the thermostat either in combination with the touch pads on the display 120 or independently.

Figure 2A:
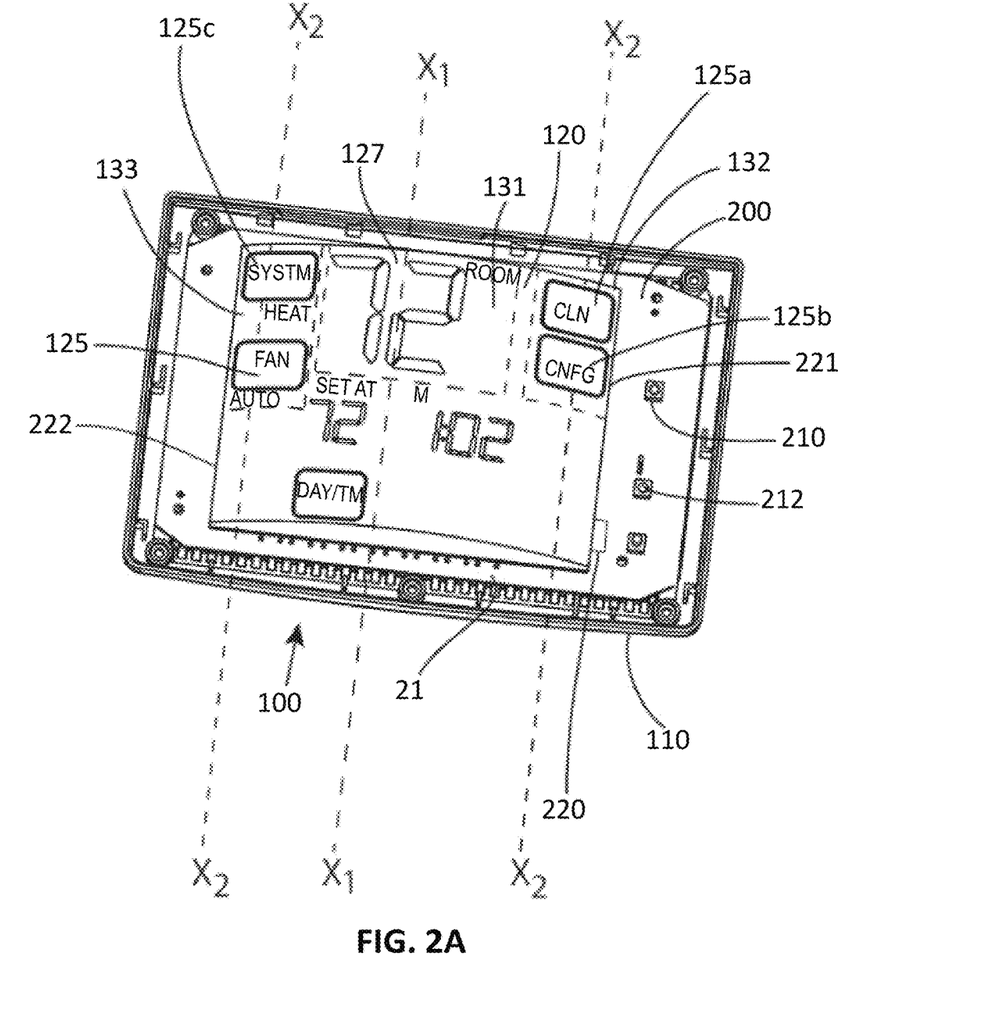
FIG. 2a is a perspective view of the control of FIG. 1 with the cover removed.

Turning to FIG. 2a the thermostat 100 depicted in FIG. 1 is illustrated having the upper cover 105 removed. With the upper cover 105 removed, the base 110 is depicted having a printed circuit board 200 exposed therein. Components are mounted on the printed circuit board 200, such as mechanical receptors 210, 212 upon which the mechanical button 130 (FIG. 1) is mounted in order to operate up and down inputs for the control of the thermostat 100. Other components such as current altering devices including a relay 21 or series of relays that control current to peripheral devices 30 such as a heat pump, air conditioner, furnace, boiler, humidifier, or ventilation damper (FIG. 1a). The relay 21 (FIG. 2a) may interrupt current, decrease current or increase current according to input from the microprocessor 14.

The flex display 120 is shown being connected to the printed circuit board 200 via connection bridge 220. The flex display screen 120 has a first end 221 and a second end 222. The display has an arc shape that places numeric icon 127 at the apex in plane $X_1$. The numeric icon 127 may be located within a first segment 131 of the display that resides substantially in a first plane $X_1$. The first segment 131 may include touch sensitive circuitry. A second segment 132 resides substantially in a second plane $X_2$ and includes touch pad buttons 125a "CLEAN" and 125b "CONFIG." A third segment 133 also resides substantially in a second plane $X_2$ and includes touch sensitive buttons 125c "SYSTEM" and 125 "FAN."

The flex display 120 connects to the printed circuit board so that the first end 221 is tethered to the printed circuit board 220. In an embodiment, the second end 222 of the flex display 120 is loose. Using an operator's fingers grabbing the second end 222, the flex display 120 can be pivoted and moved away from the face of the thermostat in order to manipulate the flex display 120. In an embodiment, other means of attaching the flex display 222 to the housing may be implemented such as attachment using adhesive for capturing the ends and edges 221, 222 or by using slots formed in the upper housing 105 or the display may be constrained by other means.

Figure 2B:
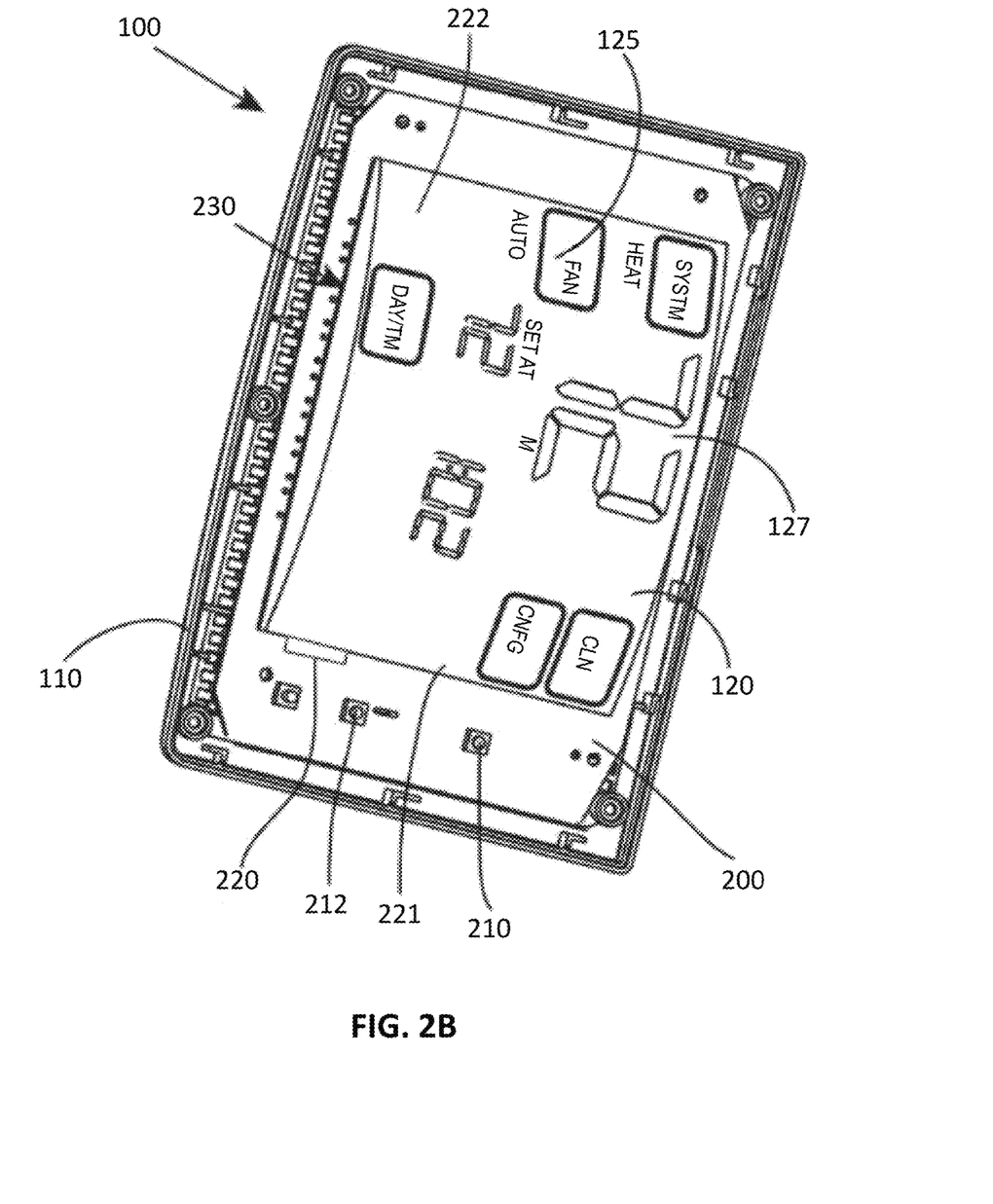
FIG. 2b is a perspective view of the invention depicting an alternate embodiment.

In an embodiment, both ends 221 and 222 of the display 120 may be secured to the housing of the thermostat 100. As depicted in FIG. 2b, the flex display 120 is shaped having a slight radius. This embodiment would enable a user of the thermostat 100 to view the display from multiple angles. If viewing from a side away from the center of the thermostat, the curvature of the display 120 may allow for improved viewing of the display. The display depicted in FIGS. 1b and 2a, b includes a clear base. However, in alternate embodiments, the base may not be clear. As well, the display may be backlit in an embodiment or in other embodiments, no backlighting is necessary. Other shapes of the flex display will be discussed below, including flex displays having multiple radiuses and curvatures.

FIG. 2b depicts a perspective view of the present invention which is similar to that depicted in FIGS. 1 and 2a. The display 120 is formed in an arc shape and maintains that form due to a frame 230 provided beneath the display 120. The frame may be formed of a polymer material and be formed in any of the myriad of shapes including those depicted in the following figures.

By placing the frame 230 under the display 120 it provides a ridged backstop to support the display 120 in the desired form. Adhesives may be used to attach the display 120 to the frame 230. Alternate embodiments of attaching the display 120 to the frame 230 may also be used. The frame 230 may likewise be attached the printed circuit board 200 via known means such as adhesives and fasteners. Thus it is understood that the display 120 is flexible and may have undesired movement in its arc shape; but when the frame 230 is placed under the display 120 it maintains the arc shape and when a user depresses the display 120 with his or her fingertip, the display 120 will not move downward away from the user's fingertip and the frame 230 will maintain the display in the desired non-planar orientation. The display 120 will be maintained in a static shape according to the shape of the frame 230.

In an embodiment the frame 230 may incorporate components of the printed circuit board 200 and in some instances the printed circuit board may comprise the frame 230. For example, with respect to FIG. 3 below, the cube shape of the display 120a may be maintained by a cube shaped frame 230 formed within and the display 120a itself and may have the componentry and circuitry of the printed circuit board so that the display itself defines the entire electronic component where the display 120a forms the exterior of the electronic component. In an alternate embodiment, the cube of FIG. 3 may be mounted to a printed circuit board and the frame 230 contained within the cube shaped display 120a may be mounted to that printed circuit board.

By manipulating the flex display 120 into different shapes during manufacture of the control, the user interaction with the control may be enhanced and allow for better interaction and viewing capability with the display screen 120. For example, the flex display 120 when being prepared in the factory may be set in position to have an "S" shape. The first end 221 can extend generally parallel to the printed circuit board 200 and at a mid-point, the flex screen may be turned at a 90°. angle from the printed circuit board 200 and at a further point along the flex screen 120 an additional 90°. bend may be made to the material and further along, an additional 90°. bend may be made to the material until the second end 222 extends out and away from the face of the thermostat 100, so that the entire display 120 forms the shape of an "S". In this way, specific surfaces of the display screen will be facing a user who is looking at the side of the control 100 and other surfaces of the display will be out of view and facing away from the viewer.

By having surfaces of the display that are both visible and not visible to the user, placement of buttons or icons at certain areas on the display may help to enhance user interaction with certain types of controls. For example, by placing display icons in non-visible locations and touch pad icons in visible locations, the user may be required to manipulate the control 100 in order to complete operations and alternate between visible and non-visible surfaces of the flex display 120. Depending on the device being controlled and the actual configuration of the control 100, these surfaces of the flex display may increase security and help require more precise user inputs to confirm operation of the control. While the control depicted in FIGS. 1 and 2 is for a thermostat, the present invention may be applied to all types of controls, including mobile devices such as, cell phones, smart phones, personal digital assistants and remote control devices for residential or manufacturing use and automotive displays.

Figure 3:
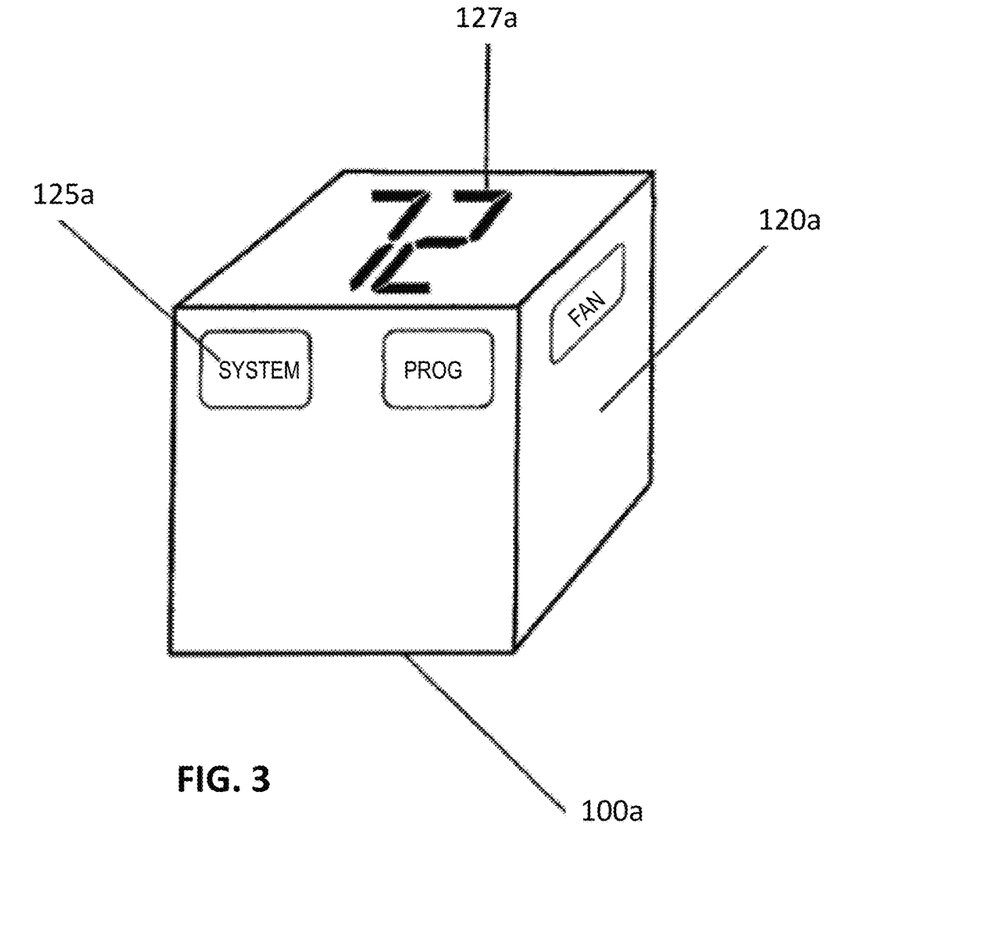
FIG. 3 is a perspective view of the display of an alternate embodiment of the invention.

Turning to FIG. 3 an alternative embodiment of the present invention is shown where the flex display 120a has been manipulated and shaped in a cube form. The base 100a may support a printed circuit board therein which may be connected via a bridge, such as discussed above, to the flex display 120a. A frame (not shown) having a cube shape may extend from the PCB to support the display 120a.

The flex display may include icons 125a indicating buttons to be operated for the control and numeric icon 127a such as, a room temperature 72°. Fahrenheit. In an embodiment, the flex display 120a may have only display capabilities and mechanical buttons linked to the microprocessor (not shown) may operate the device. In an alternate embodiment, the flex display 120a may have touch sensitive areas and the button icons 125a may be operated by touching in the touch sensitive area designated by the rectangle surrounding button icon 125a. Likewise, the numeric icon area 127a may include touch sensitive regions which may allow for interaction by a user. In an alternative embodiment, flex display 120a may be a flex display on one or more sides and other sides may use non-flexible displays or touchscreens.

Figures 4A, 4B:
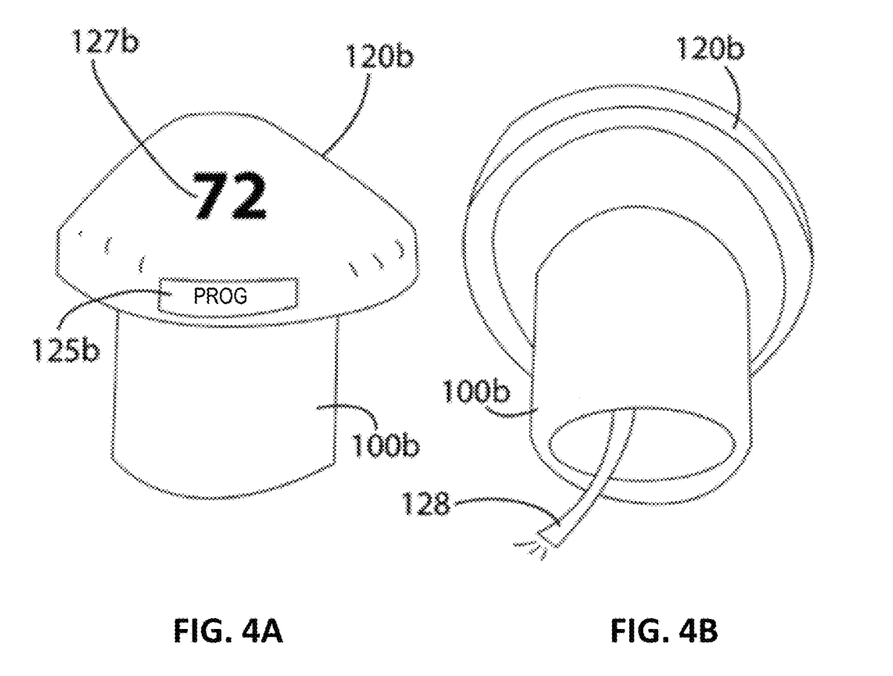

FIG. 4a is a side elevation view and FIG. 4b is a perspective view of an alternate embodiment of the invention. The flex display 120b in FIG. 4a, b is formed in a conical shape. The buttons 125b extend partially around the circumference of the conical portion 120b of the display. Users may view the buttons 125b (e.g. "PROG") and numeric icon 127b from multiple angles. This may improve the user interaction and lead to many benefits for the operation and control of devices linked to the display 120b. For example, if the flex display of FIG. 4 is mounted on a dashboard of an automobile, a user may more easily locate that specific control by recognizing the shape of the control with the user's fingers; without taking the user's eyes off the road. Such shaped flex display components 120b may be used for other types of equipment such as, manufacturing machines and on other mobile devices.

FIG. 4b depicts a perspective view of the bottom of an alternate embodiment of the control having a base 100b into which the printed circuit board and other components may be mounted or attached. The flex display area 120b includes icons or touch sensitive areas such as numeric icon 127b where the numeric display of 72°. is depicted (FIG. 4a). A further alternate embodiment is depicted in FIG. 4b showing the underside of the flex display 120c mounted on the base 100b having a connection wire 128 extending from the base 100b.

Figure 5:
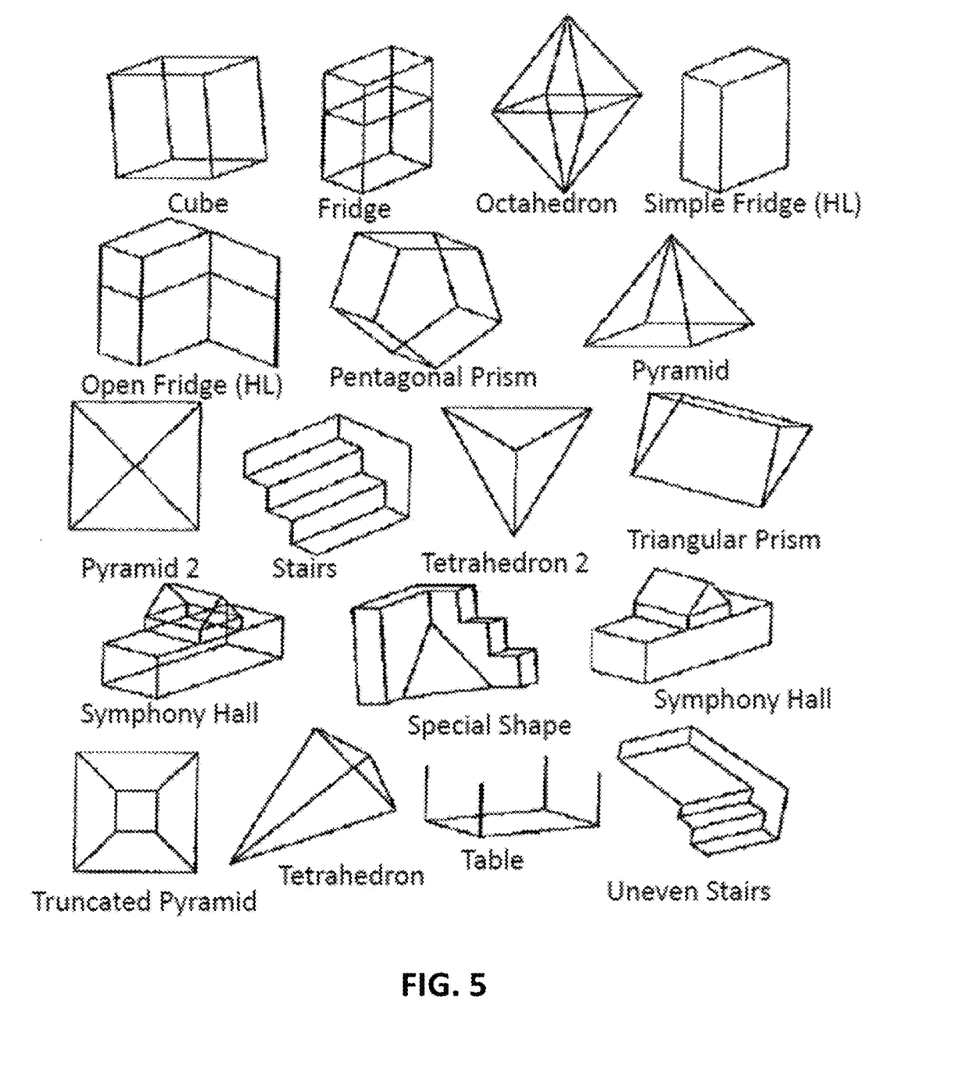
FIG. 5 is a schematic representations of alternative embodiments of the displays of the present invention.

It is intended by the present invention that the flex display may have multiple shapes that may have uses in many different applications. For example, FIG. 5 depicts other shapes to which the flex display may be formed and applied in different applications. The shapes depicted in FIG. 5 include a cube, fridge, octahedron, simple fridge (HL), open fridge, pentagonal prism, pyramid, pyramid 2, stairs, tetrahedron 2, triangular prism, symphony hall, special shape, symphony hall (HL), truncated pyramid, tetrahedron, table or uneven stairs. Other shapes not depicted in FIG. 5 are also incorporated into the present invention for which the flex display may be shaped for uses and other types of control applications. By providing surfaces in different orientations of the flex display, users may interact differently with certain parts of the display and their inputs may be more intuitively controlled by the software of the control system. In particularly, the use of a non-planar display provides for user interactions in the Z-axis. For example, turning to FIG. 1 the X-, Y- and Z-axes are depicted where X represents movement of a user's hand along the upper surface of the control moving from bottom to top of the housing 105. The Y-axis represents movement of a user's hand from left to right across the face of the housing 105. The Z-axis is movement out of the page, e.g. elevated above the face of the housing 125 and display 120. So by forming the display 120 in modified non-planar shapes, a user's interaction will require more Z-axis movements and touches and different elevations to enhance user interactions. As well, where the display includes photographs or videos, the alternate display surfaces of the shaped flex display can produce more interesting and eye catching user interactions which may be used to more intuitively interact with the user in order to guide through the control process more easily.

Figure 6:
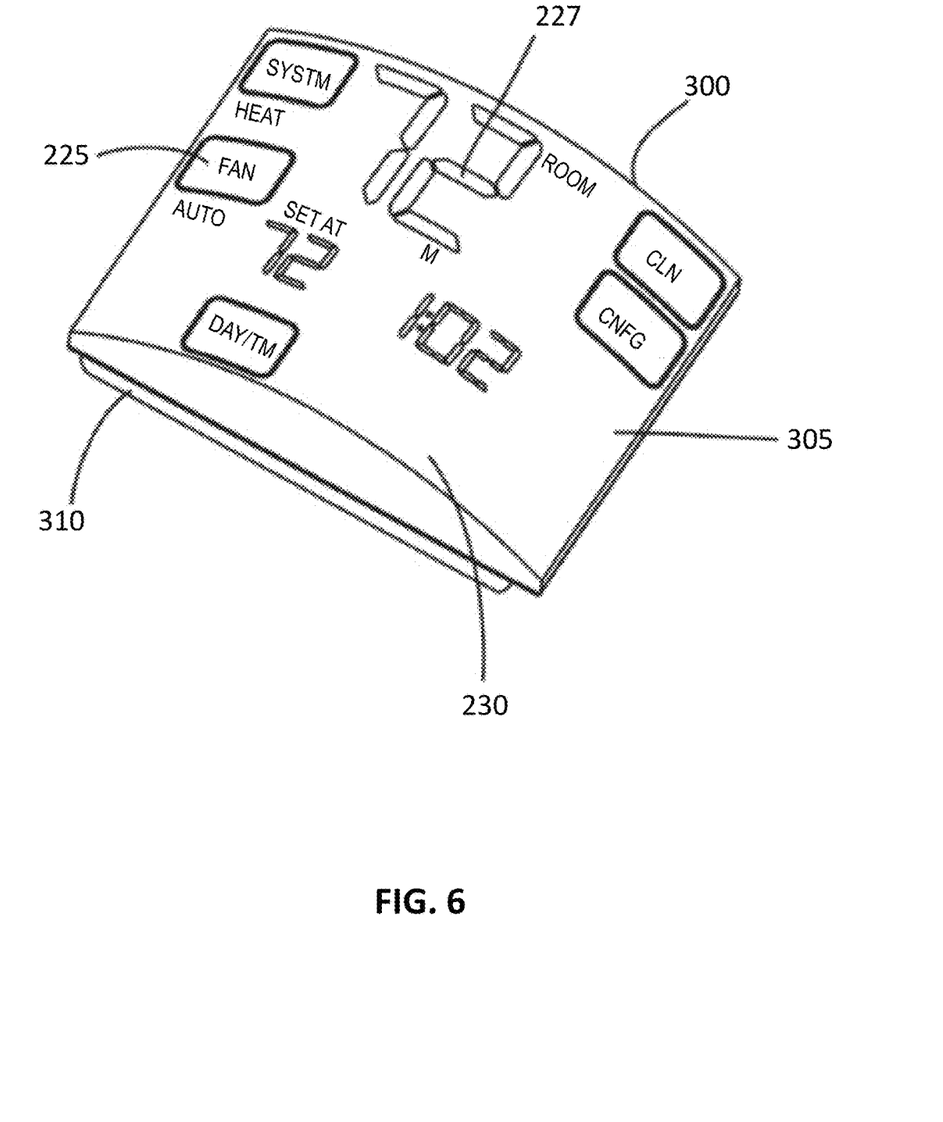
FIG. 6 is a perspective view of the control of an alternative embodiment of the present invention.

Turning to FIG. 6, an embodiment of the present invention is disclosed where a thermostat 300 includes an edge to edge design with an upper display 305 and lower housing 310 or base. Display 230 is shown having a curvature protruding from lower housing 310. The display 305 includes means for displaying alphanumeric characters and touch sensitive areas to provide means for an operator to use fingertips to control functions of the electronics. The display, in this embodiment, includes icons for operation of the thermostats functions such as fan, such as touchpad 225. Numeric Icon 227 depicts a numeric icon as a control parameter for example, the temperature. In an embodiment, the display 305 includes touch sensitive capability and the operation of the thermostat 300 is performed by touch pads 225 for example, to operate the fan mode. The other touch pads on the display screen are also operative to control the thermostat 300. This display 305 has touchpads 225 that reside in a different plane as compared to the numeric icon 227 (as discussed previously with respect to FIG. 2a.

The present invention has been described in terms of preferred embodiments. It will be understood by those skilled in the art that the present invention may be embodied in others specific forms without departing from the scope of the invention disclosed and that examples in embodiments described herein are in all respects illustrative and not restrictive. Those skilled in the art of the present invention will recognize that other embodiments using the concepts described herein are all also possible. Further, any reference to the claim elements in the singular, for example using articles a, and, or, the, is not to be construed as limiting the element to the singular.

What is claimed is:

1. A control panel comprising:
    a housing comprising a face that defines an X-axis and Y-axis defining a first plane, and a Z-axis defining a line extending perpendicularly through the first plane of the housing, whereby the perpendicular line extends upward out of the first plane of the housing and downward through the back of the housing;
    a circuit board coupled to the housing, the circuit board including circuitry and electronic components for control of a first peripheral device and a second peripheral device, the circuitry controlling at least one current altering device for control of the first and second peripheral devices;
    a non-planar shaped frame coupled to the housing;
    a display panel disposed upon and supported by the non-planar shaped frame, the display panel being formed by the frame into a non-planar shape, the display panel having at least one point secured by the housing, the display panel connected to the circuitry via a current carrying bridge member, the display panel oriented in the Z-direction such that the display panel can be fitted into the housing such that discrete surfaces of the display panel are adapted to be visible to a user when viewed from a side of the control panel and other surfaces of the display panel are adapted be out of view of the user, the display panel comprising a first non-planar information area and a second non-planar information area the first non-planar information area of the display comprising at least a first touch sensitive area that controls the current altering device to adjust a peripheral control function of at least one of heat, cool, fan, temperature, time, ventilation and humidity, the second non-planar information area of the display comprising an alphanumeric icon.

2. The control panel of claim 1, wherein the display panel is formed in an arc and each of the first and second non-planar information areas is substantially arch shaped in cross-section and having a vertex formed by the arc shape.

3. The control panel of claim 1, wherein the first non-planar information area comprises function control buttons, the first non-planar information area comprising a discrete display area with respect to the second non-planar information area.

4. The control panel of claim 1, wherein the display panel is formed in an arc and the first and second non-planar information areas are located in different planes.

5. The control panel of claim 1, wherein the housing has an opening formed therein for receiving the display panel, the opening formed in the first plane, at least one of the first and second non-planar information areas extending outwards from the first plane of the housing.

6. The control panel of claim 1, wherein at least one of the first and second non-planar information areas extends past said first exterior edge of the housing.

7. The control panel of claim 1, wherein at least one of the first and second non-planar information areas extends internally with respect to the housing.

8. The control panel of claim 1, wherein the current altering device is located externally with respect to the housing.

9. The control panel of claim 1, wherein the first non-planar information area comprises a touch sensitive area and the second non-planar information area comprises an alphanumeric display area located adjacent the first non-planar information area.

10. The control panel of claim 1 wherein said first peripheral device comprises one of a heat pump, air conditioner, furnace, boiler, humidifier, fan and ventilation damper.

11. The control panel of claim 1, wherein the display is formed in a non-planar shape and forms one of a concave arc, convex arc, cube, octahedron, pentagonal prism, tetrahedron, triangular prism, truncated pyramid, stairs, cone, and mushroom shape.

12. A thermostat comprising the control panel of claim 1.

13. The thermostat of claim 12, wherein the first and second non-planar information areas on the display panel are formed in a non-planar shape such that a user's hand can adjust the operation of the control panel at least along the Z-axis, whereby the control functions are adjustable by touching the first and second non-planar information areas.

14. The control panel of claim 1, wherein the display panel extends over a first exterior edge of said housing and a second exterior edge of said housing, wherein said first edge is opposite said second edge.

15. The control panel of claim 1 further comprising an upper cover coupled to the housing, the upper cover holding the display in place and maintaining the display in a static shape.

16. The control panel of claim 1 wherein the non-planar shaped frame is formed into a convex shape.

17. A thermostat configured to control a furnace comprising:
    a) a housing comprising:
        i) a circuit board including circuitry and electronic components including a current altering device for control of said furnace; and
        ii) a housing panel;
    b) a convex shaped frame coupled to said housing;
    c) a display panel disposed upon and supported by the convex shaped frame, the display panel being formed by the convex shaped frame into a convex shape, the display panel comprising:
        i) a first segment with a first touch sensitive area connected to said current altering device to adjust a furnace control function;
        ii) a second segment comprising at least one alphanumeric icon;
    wherein said display is backlit.

18. A method of producing a control panel comprising the steps of:
    producing a housing, the housing comprising a face that defines an X-axis and Y-axis defining a first plane, and a Z-axis defining a line extending perpendicularly through the first plane of the housing, whereby the perpendicular line extends upward out of the first plane of the housing and downward through the back of the housing;

coupling a circuit board to the housing, the circuit board including circuitry and electronic components for control of a first peripheral device and a second peripheral device, the circuitry controlling at least one current altering device for control of the first and second peripheral devices;

coupling a non-planar shaped frame to the housing;

disposing upon the non-planar shaped frame a flexible display panel so that the non-planar shaped frame supports and shapes the flexible display panel into a non-planar shape so that discrete surfaces of the flexible display panel are adapted to be visible to a user when viewed from a side of the control panel and other surfaces are adapted to be out of view of the user when viewed from said side of the control panel;

securing the flexible display panel to the housing at at least one point; and connecting the flexible display panel to the circuit board via a current carrying bridge member;

wherein the flexible display panel comprises a first non-planar information area and a second non-planar information area, the first non-planar information area comprising at least a first touch sensitive area that controls the current altering device to adjust a peripheral control function of at least one of heat, cool, fan, temperature, time, ventilation and humidity, the second non-planar information area of the display comprising an alphanumeric icon.

19. The method of producing a control panel of claim 18 wherein the display panel is formed in an arc and each of the first and second non-planar information areas is substantially arch shaped in cross section and wherein each of the first and second non-planar information areas includes a vertex formed by the arc shape.

20. The method of producing a control panel of claim 18 wherein the first non-planar information area comprises function control buttons, the first non-planar information comprising a discrete display area with respect to the second non-planar information area.

21. The method of producing a control panel of claim 18 wherein the flexible display panel is formed in an arc and the first and second segments are located in different planes.

22. The method of producing a control panel of claim 18 wherein the housing has an opening formed therein for receiving the display panel, the opening formed in the first plane, at least one of the first and second non-planar information areas extending outwards from the first plane of the housing.

23. The method of producing a control panel of claim 18 wherein at least one of the first and second non-planar information areas extends past said first exterior edge of the housing.

24. The method of producing a control panel of claim 18 wherein at least one of the first and second non-planar information areas extends internally with respect to the housing.

25. The method of producing a control panel of claim 18 wherein the current altering device is located externally with respect to the housing.

26. The method of producing a control panel of claim 18 wherein the first non-planar information area comprises a touch sensitive area and the second non-planar information area comprises an alphanumeric display area located adjacent the first non-planar information area.

27. The method of producing a control panel of claim 18 wherein said first peripheral device comprises one of a heat pump, air conditioner, furnace, boiler, humidifier, fan and ventilation damper.

28. The method of producing a control panel of claim 18 wherein the flexible display panel is formed in a non-planar shape and forms one of a concave arc, convex arc, cube, octahedron, pentagonal prism, tetrahedron, triangular prism, truncated pyramid, stairs, cone, and mushroom shape.

29. The method of producing a control panel of claim 18 wherein the flexible display panel extends over a first exterior edge of said housing and a second exterior edge of said housing, wherein said first edge is opposite said second edge.

30. The method of producing a control panel of claim 18 further comprising the step of coupling an upper cover to the housing so that the upper cover holds the display in place and maintains the display in a static shape.

31. The method of producing a control panel of claim 18 wherein the non-planar shaped frame is formed into a convex shape.

* * * * *